(12) United States Patent
Liu et al.

(10) Patent No.: US 7,412,132 B1
(45) Date of Patent: Aug. 12, 2008

(54) MINI FIBER OPTIC ISOLATOR

(75) Inventors: Hongdu Liu, Hong Kong (CN); Xiangzhi Lin, Hong Kong (CN); Yijun Li, Hong Kong (CN); Xiaoming Cui, Hong Kong (CN)

(73) Assignee: Sino Point Technology, Ltd., Hong Kong (CN)

( * ) Notice: Subject to any disclaimer, the term of this patent is extended or adjusted under 35 U.S.C. 154(b) by 0 days.

(21) Appl. No.: 11/229,849

(22) Filed: Sep. 19, 2005

Related U.S. Application Data

(60) Provisional application No. 60/611,402, filed on Sep. 20, 2004, provisional application No. 60/611,549, filed on Sep. 20, 2004, provisional application No. 60/611,550, filed on Sep. 20, 2004.

(51) Int. Cl.
G02B 6/32 (2006.01)
G02B 6/26 (2006.01)
G02B 6/34 (2006.01)

(52) U.S. Cl. ........................................ 385/34
(58) Field of Classification Search ............... 385/34, 385/31, 37
See application file for complete search history.

(56) References Cited

U.S. PATENT DOCUMENTS

| | | | |
|---|---|---|---|
| 5,689,593 A * | 11/1997 | Pan et al. | 385/11 |
| 5,818,981 A * | 10/1998 | Pan et al. | 385/11 |
| 6,061,167 A * | 5/2000 | Song | 359/256 |
| 6,181,846 B1 * | 1/2001 | Pan | 385/18 |
| 6,430,323 B1 * | 8/2002 | Kokkelink et al. | 385/11 |
| 6,480,331 B1 * | 11/2002 | Cao | 359/484 |
| 7,081,996 B2 * | 7/2006 | Wills et al. | 359/484 |
| 2001/0036330 A1 * | 11/2001 | Delisle et al. | 385/11 |
| 2002/0012167 A1 * | 1/2002 | Wills et al. | 359/484 |
| 2002/0089745 A1 * | 7/2002 | Huang et al. | 359/484 |
| 2002/0131142 A1 * | 9/2002 | Cheng et al. | 359/246 |
| 2002/0159151 A1 * | 10/2002 | Li | 359/498 |
| 2002/0181100 A1 * | 12/2002 | Cao | 359/484 |
| 2003/0053209 A1 * | 3/2003 | Chang et al. | 359/484 |
| 2003/0091260 A1 * | 5/2003 | Chang et al. | 385/11 |
| 2004/0100693 A1 * | 5/2004 | Cao | 359/484 |
| 2005/0152642 A1 * | 7/2005 | Xu et al. | 385/24 |

* cited by examiner

Primary Examiner—Kianni C Kaveh
(74) Attorney, Agent, or Firm—Robert J. Rios; Hoglund & Pamias, PSC

(57) ABSTRACT

A fiber optic array is miniaturized in a configuration that includes an input collimator, a first birefringence crystal, a waveplate, a Faraday rotator, a second birefringence crystal and a second collimator. The elements are aligned along a common optical axis. A light beam along the optical axis that is passed through the first collimator emerges off of the optical axis and through the remaining elements. It re-emerges from the fiber optic array on axis. The configuration provides substantial attenuation in a backward direction.

20 Claims, 3 Drawing Sheets

MINI FIBER OPTIC ISOLATOR

FIELD OF THE INVENTION

The present invention is directed generally to fiber optic devices, and more particularly to a miniaturized configuration that achieves high isolation.

BACKGROUND

Optical fibers have many uses in modern communications systems. They serve to direct beams of light between components in such systems. Optical fibers have been developed to have low loss, low dispersion, polarization maintaining properties and can be incorporated into several different types of devices, such as amplifiers, filters, lasers and interferometers. Many communication systems require an isolator.

Fiber optic isolators are passive optical devices that allow light to be transmitted in only one direction. They are most often used to prevent any light from reflecting back down the fiber, as this light could enter the source and cause backscattering or feedback problems. Optical feedback degrades signal-to-noise ratio and consequently bit-error rate. Ideally an isolator would pass all light in one direction and block all light in the reverse direction.

Some of the specifications used to measure a fiber optic isolator include center wavelength, isolation, insertion loss and polarization dependent loss. Center wavelength is the center of the wavelength range in which the isolator is designed to function optimally. This characteristic is usually measured in nm. Isolation, generally measured in decibels (db), is a measure of how effectively back reflections are prevented and the degree to which the isolator can transmit. Insertion loss is the attenuation caused by the insertion of an optical component. Polarization dependent loss is the attenuation caused by polarization variation. Fiber optic isolators are commercially available at various specifications. For example, U.S. Pat. No. 4,893,890, titled "Low-Loss, High-Isolation, Fiber-Optical Isolator," issued to Lutes on Jan. 16, 1990, and U.S. Patent Publication No. 2004/0169926, titled "Module Assembly for Fiber Optic Isolator," by Blair, et al., and published on Sep. 2, 2004, both disclose such fiber optic isolators. Both of these references are incorporated in their entirety.

In addition to these optical properties, another physical characteristic, namely size, can be important for some applications. Unfortunately, it is difficult to obtain high performance characteristics in a small size. Accordingly, an improved design is needed.

SUMMARY OF THE INVENTION

According to one aspect of the invention, a fiber optic isolator includes an input collimator, a first birefringence crystal, a wave plate, a Faraday rotator, a second birefringence crystal and an output collimator. The input collimator is positioned along an optical axis. It is configured to receive a beam of light through an optical fiber along the optical axis and to emit the beam of light at an angle with respect to the optical axis. The first birefringence crystal has an input face and an output face positioned at an angle with respect to the optical axis. It is positioned along the optical axis. It is configured to receive the beam of light from the input collimator and separate the beam of light into an extraordinary (e-beam) and an ordinary (o-beam). The waveplate is positioned along the optical axis and is configured to receive the e-beam and the o-beam from the first birefringence crystal. The waveplate is configured to rotate the polarization of the o-beam and the e-beam by 45 degrees in a first direction. The Faraday rotator is positioned along the optical axis and configured to receive the e-beam and the o-beam from the waveplate. It rotates the polarization by a further 45 degrees in the first direction. The second birefringence crystal has an input face and an output face positioned at an angle with respect to the optical axis that match the angle of the input and output face of the first birefringence crystal. The birefringence crystal is positioned along the optical axis. It is configured to receive the e-beam and the o-beam from the Faraday rotator. The second birefringence crystal combines the e-beam and the o-beam and emits the combined beam at an angle off of the optical axis. The output collimator is positioned along the optical axis. It is configured to receive the combined beam from the second birefringence crystal and to reorient the combined beam along the optical axis.

According to further aspects of the invention, the input collimator and the output collimator are made of a graded index fiber. The distance between the input collimator and the first birefringence crystal is equal to a distance between the second birefringence crystal and the output collimator. The first and the second birefringence crystal have an equal length. The angle of the input face of the first birefringence crystal and the output face of the second birefringence crystal are selected so that a path length of the e-beam and the o-beam from the front face of the first birefringence crystal to the output face of the second birefringence crystal are equal. The angle of the input face of the first birefringence crystal and the angle of the output face of the second birefringence crystal are selected to minimize polarization mode dispersion, which is less than or approximately equal to 0.01 ps. The waveplate and the Faraday rotator each rotate the polarization counter-clockwise along a forward direction of the optical axis.

According to another aspect of the invention a fiber optic isolator includes first and a second birefringence crystal. Each crystal has an input face and an output face and each are positioned along an optical axis. The first birefringence crystal is configured to receive a beam of light from a fiber optic system wherein the beam of light enters the first birefringence crystal at an angle with respect to the optical axis. The second birefringence crystal is configured to emit the beam of light into a fiber optic system at an angle with respect to the optical axis. Between the first and second birefringence crystals, a means for rotating polarization of the beam of light in a forward direction is positioned along the optical axis.

According to further aspects of the invention, the input face of the first birefringence crystal and the output face of the second birefringence crystal are at an equal angle with respect to the optical axis and the output face of the first birefringence crystal and the input face of the second birefringence crystal are at an equal angle with respect to the optical axis. The first birefringence crystal is configured to divide the beam into an e-beam and an o-beam and the second birefringence crystal is configured to combine the e-beam and the o-beam. The first and second birefringence crystals have an equal length so that a path length of the e-beam and a path length of the o-beam are equal from the input face of the first birefringence crystal to the output face of the second birefringence crystal. When an e-beam and an o-beam are transmitted along a backward direction, the first birefringence crystal does not combine the e-beam and the o-beam. The means for rotating polarization of the beam of light comprises a waveplate and a Faraday rotator positioned along the optical axis so that the means for rotating polarization of the beam of light rotates the e-beam and the o-beam by ninety degrees in a forward direction along the optical axis and by zero degrees in a backward direction along the optical axis.

According to still further aspects of the invention, the fiber optic isolator includes an input and an output collimator. The input collimator is positioned along the optical axis before the first birefringence crystal and an output collimator is positioned along the optical axis after the second birefringence crystal. The fiber optic isolator has a diameter of approximately 2.5 mm or less and a length of approximately 15 mm or less.

According to another aspect of the invention, a beam of light is transmitted along a forward direction. The beam of light is passed through a first collimator which is positioned along an optical axis. The beam of light emerges from the first collimator at angle with respect to the optical axis. The beam of light then passes into a first birefringence crystal which separates the beam of light into an e-beam and an o-beam. The e-beam emerges from birefringence crystal at an angle with respect to the o-beam. The e-beam and the o-beam then pass into a waveplate and a Faraday rotator. The e-beam and the o-beam are each rotated by ninety degrees. The e-beam and the o-beam are then passed through a second birefringence crystal. The second birefringence crystal combines the e-beam and the o-beam. The combined beam emerges from the birefringence crystal at an angle with respect to the optical axis. The combined beam then is passed into a second collimator, which is positioned along the optical axis. The beam of light that emerges from the second collimator is aligned along the optical axis.

According to further aspects of the invention, the first birefringence crystal refracts the e-beam at a first angle and refracts the o-beam at second angle different than the first angle. When a beam of light is reflected through the waveplate and the Faraday rotator in a backward direction, its polarization is not changed.

DETAILED DESCRIPTION OF THE INVENTION

The present invention is applicable to fiber optic devices, and it is particularly directed to optical isolators. It presents a configuration suitable for miniaturization which is also capable of achieving high isolation and low loss. One aspect of the design involves the beam angle between an input collimator and an input birefringence crystal. The beam enters the input collimator along its optical axis but emerges as a slight angle. This off-axis propagation is exploited to achieve the high return loss and high isolation. A beam passing along the forward direction is routed out of the isolator along the axis of the optical system, whereas a beam passing along the backward direction is routed out of the isolator off the axis of the optical system.

Figure 1:
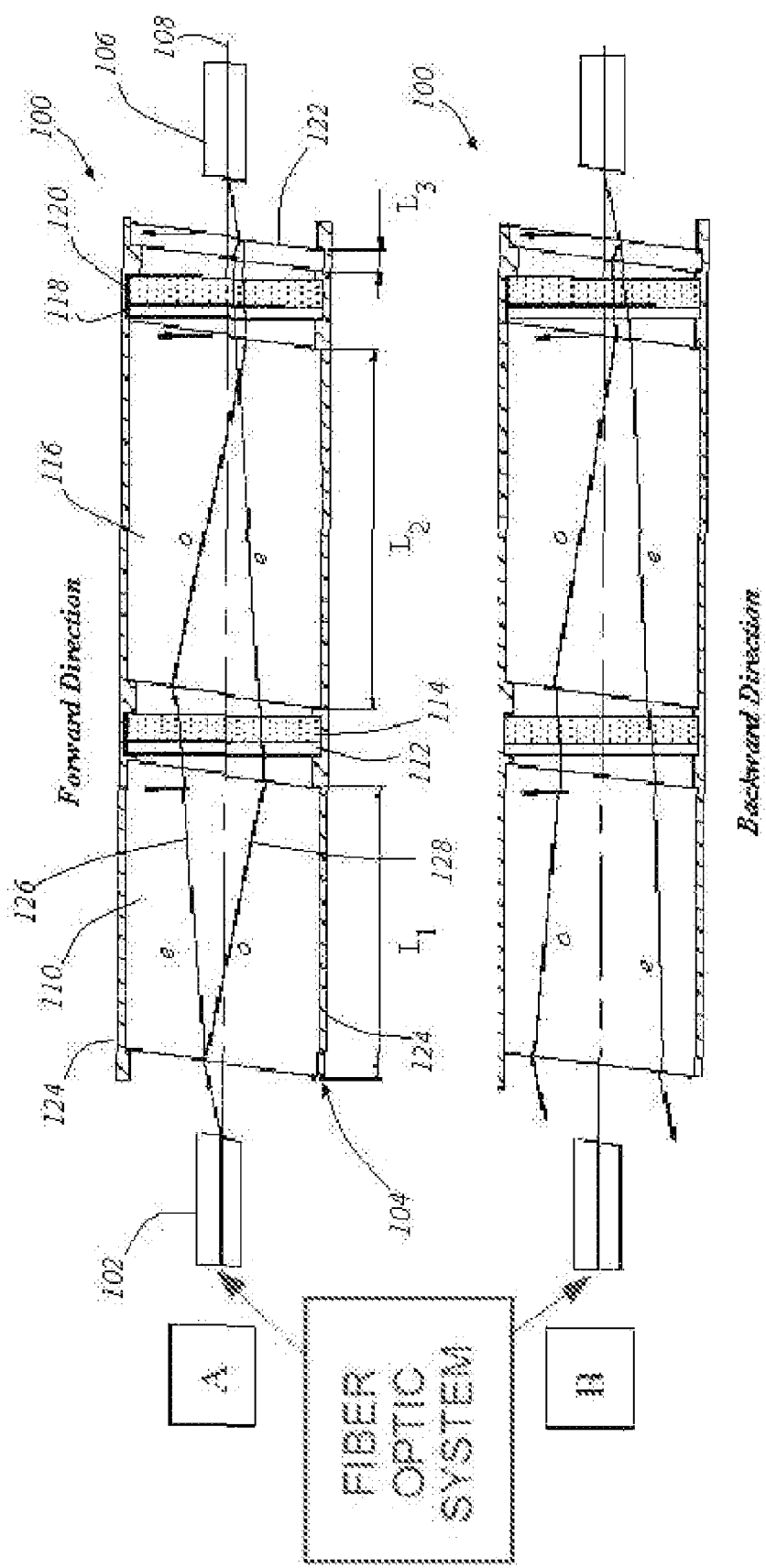
FIG. 1 is a schematic diagram of a mini isolator with walk-off compensation.

A schematic of an embodiment is shown in FIG. 1, including a forward path A, and a backward path B. It includes an input collimator 102, an isolator core 104 and an output collimator 106. These are aligned along a common optical axis 108. Together these form a mini fiber optic isolator (hereinafter "mini isolator") 100. The isolator core includes a first birefringence crystal 110, which operates as a displacer. The next element is a 45 degree waveplate. The next element is a garnet crystal Faraday rotator 114. Finally, the isolator core includes a second birefringence crystal 116, which also operates as a displacer. These elements are mounted on a silicon stripe 118, which acts as the silicon optical bench (SiOB). As part of the isolator core, each is mounted along the optical axis.

Figure 4:
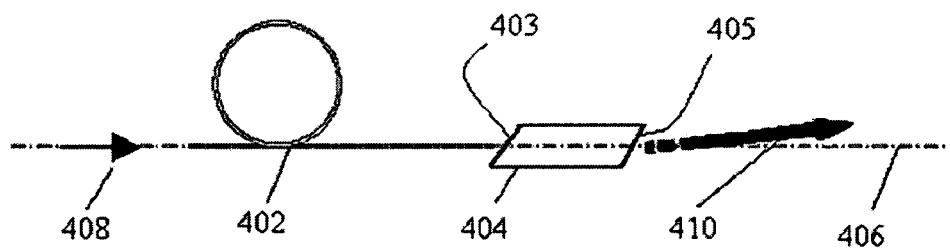
FIG. 4 is a schematic diagram of an optical fiber terminating in the collimating lens, shown in FIG. 1.

The cross section of the isolator core is rectangular, or square, and is fitted within a magnetic ring having a 1 mm inner diameter and a 2 mm outer diameter. The magnetic field generated inside the ring is along the forward direction of the optical axis. In an embodiment using a latched garnet for the Faraday rotator, the magnetic ring is not needed. The collimators are preferably miniaturized, such as described in U.S. patent application Ser. No. 11/218,338, titled "Mini Fiber Optic Collimator Array" by Liu, et al., on Sep. 1, 2005, which is incorporated by reference in its entirety. One such design is shown in FIG. 4 and is further described below. The spot size of the collimator ranges from some tens microns up to 100 to 200 μm, depending on the parameters selected. The illustrated configuration can be packaged within dimensions of 2.5 mm in diameter and 15 mm in length for the structure shown in FIG. 1 or even smaller in diameter if the latched garnet crystal is used. This reduced size can be important for many applications.

In FIG. 1 the beam is shown propagating along the forward direction along path A. The light beam enters the input collimator 102 along the optical axis 108, but emerges at a slight angle. It passes into the first birefringence crystal 110 and is decomposed into the ordinary beam (hereinafter "o-beam") 120 and extraordinary beam (hereinafter "e-beam") 122. Both the o-beam 120 and e-beam 122 continue into the waveplate 112 and the Faraday rotator 114, by which combination they are rotated over 90 degree. They emerge from these elements and pass into the second birefringence crystal 116, through which they are recombined and exit at a slight angle with respect to the optical axis. The beam then enters an output collimator 106, which redirects the beam along the optical axis.

The isolator core 104 is matched in that the first birefringence crystal 110 and the second birefringence crystal 116 have the same length, $L_1=L_2$. The distance between the input collimator 102 and the first crystal 110 is equal to the distance between the second crystal 116 and the output collimator 106. The input face of the first crystal 110 is cut at an angle matching the angle of the output face of the second crystal 116. And, the output face of the first crystal 110 is cut at an angle matching the angle of the input face of the second crystal 116. The input and output angle of the first crystal 110 may be the same, and in this configuration the input and output angle of the second crystal 116 would also be the same.

The recombination of the o-beam and the e-beam is achieved by compensating for the walk-off of the birefringence crystal. Specifically, this is achieved by selecting the output or pointing angle of the first collimator, $\alpha$, (and matching input angle of the second collimator) and by selecting the facet angle, $\beta$, of the input and output faces of the birefringence crystal elements 110 and 116. The incident angle at the input facet of the first birefringence crystal element respect to the normal direction will be equal to $\alpha+\beta$. It is the same angle, $\alpha+\beta$, for the emerging beam at the output facet of the second birefringence crystal element.

In the configuration shown, the walk-off is along the same direction, namely vertical for both the birefringence crystal elements 110 and 116. This is also in the same plane as the o-beam and the e-bean. The walk-off, however, can be along any other direction, for example horizontal, without affecting the functionality as long as the walk-off direction for both the birefringence crystal elements is the same.

As the optical layout shown in FIG. 1 is symmetric, the optical paths for o-beam and e-beam are equal, resulting in very low polarization mode dispersion (PMD). By taking into account the optical path tolerances in the optical layout, PMD of the mini isolator can be less than 0.01 ps.

As shown in FIG. 1 along the backward path B, the recombination of the o-beam and the e-beam does not occur in the backward direction. The two emerge along separate paths from the first birefringence crystal element, which results in high optical loss for the backward transmission. This configuration is able to achieve isolation of as much as 30 dB or higher over a ±15 nm band centered at either 1550 or 1310 nm.

Figure 2:
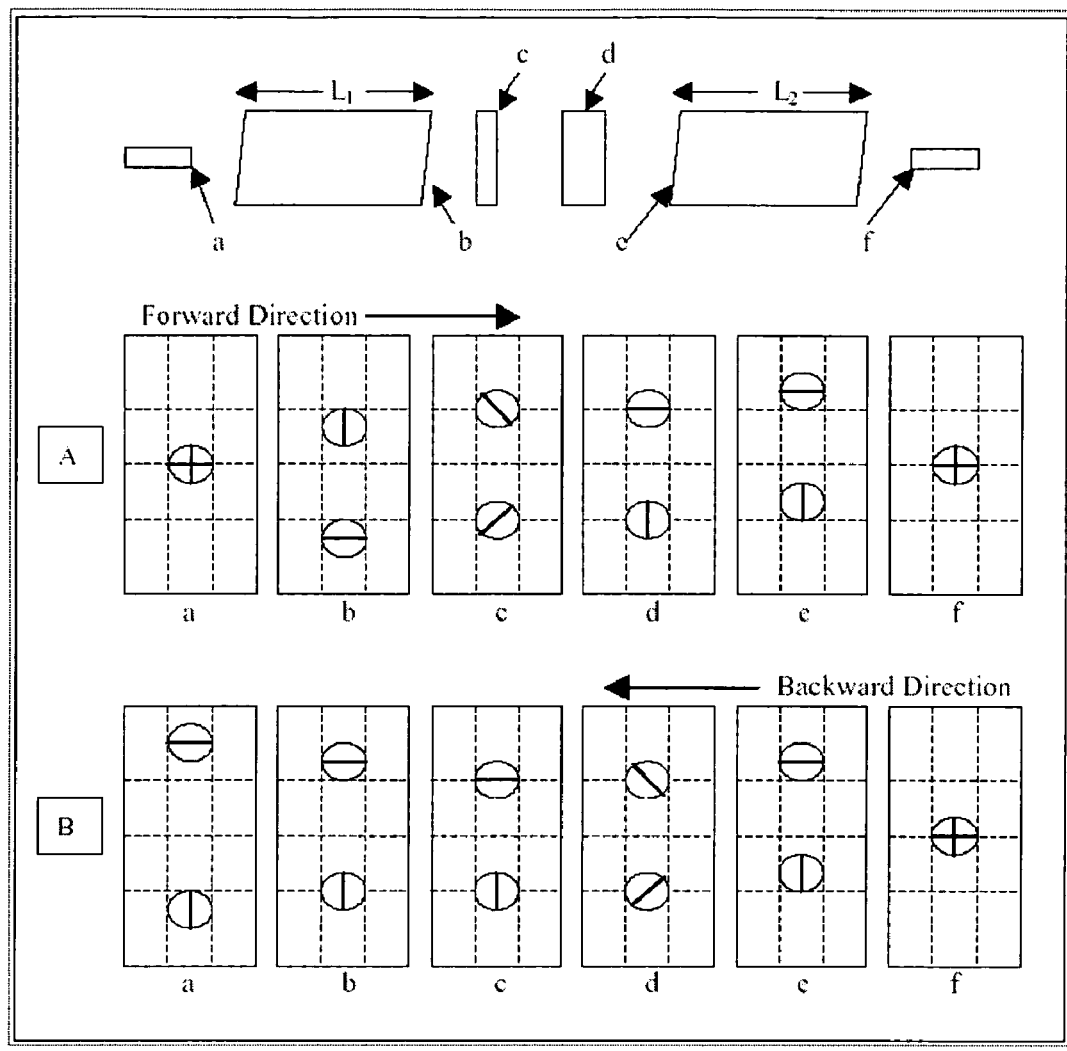
FIG. 2 is a schematic diagram of the variation of polarization states of optical beams through the mini isolator of FIG. 1.

The variation of the polarization states of the optical beams along the forward and backward directions are shown in FIG. 2, which is schematic and not to scale. The polarization states for the input collimator, the input birefringence crystal, the 45 degree waveplate, the Faraday rotator, the output birefringence crystal and the output collimator are shown as blocks (a), (b), (c), (d), (e) and (f), respectively.

As shown in FIG. 2, along the forward direction, light emerging from the input collimator (a) is decomposed by the input birefringence crystal (b) into an o-beam (shown as the lower beam) and the e-beam (shown as the upper beam). Next, the polarization of both the o- and e-beams is rotated by 45 degrees by the waveplate (c) and then rotated by a further 45 degrees by the garnet Faraday rotator (d). The total rotation through the Faraday rotator (d) therefore totals 90 degrees, which means that the polarization states of the o-beam and the e-beam have interchanged. This is shown in FIG. 1 along path A. These two optical beams with reversed polarization states continue to propagate through the second birefringence crystal element (e) and are recombined and overlapped into one optical beam when emerging out of the birefringence crystal into free space. Due to the symmetric layout of the optical system, it compensates for the walk-off through the birefringence crystals. The recombined beam will enter the second or output collimator (f) at an angle with respect to the optical axis, however, it is reoriented along the optical axis by this collimator.

As also shown in FIG. 2, along the backward direction, light emerging or reflected by or through the output collimator (f) is decomposed by the output birefringence crystal (e) into a o-beam and the e-beam. Unlike the propagation shown in the forward direction, the o-beam is shown as the upper beam and the e-beam is shown as the lower beam. Next, the polarization of both the o- and e-beams is rotated clockwise by 45 degrees by the garnet Faraday rotator (d) and then rotated back counter-clockwise by 45 degrees by waveplate (c). The total rotation through the Faraday rotator (d) and the waveplate (c) therefore totals 0 degrees, which means that unlike the forward direction, the polarization states of the o-beam and the e-beam have not been interchanged. This is shown in FIG. 1 along path B. These two optical beams continue to propagate through the first birefringence crystal element (b). When they emerge, they follow separate paths out of the birefringence crystal into free space.

Although the rotation of o-beam and e-beam polarization is shown schematically as counter-clockwise along the forward direction of FIG. 2, the rotation could also be clockwise. In this case, the rotation along the reverse direction would be clockwise and counterclockwise through the Faraday rotator (d) and the waveplate (c), respectively.

Figure 3:
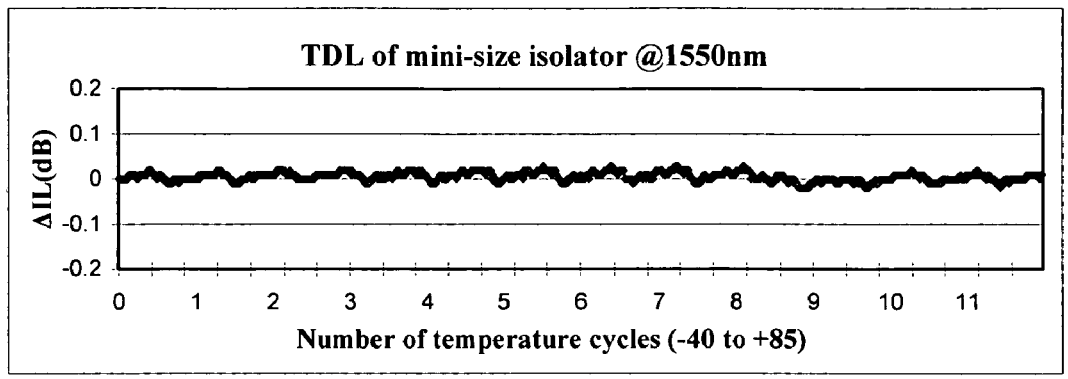
FIG. 3 is a graph showing temperature dependent loss of a mini isolator at 1550 nm.

As mentioned above, the mini isolator core, consisting of birefringence crystals and rotators, can be mounted on an SiOB to enhance the stability and reliability of the isolator. Based on the optical and packaging designs, the insertion loss of the mini isolator can be reduced to less than 0.35 dB at room temperature. The temperature dependent loss of the mini isolator can be less than 0.1 dB over the wide temperature range of −40° C. to +85° C. A typical example shown is in FIG. 3. In addition, the polarization dependent loss (PDL) meets the specification of less than 0.1 dB and can be as low as 0.02 dB.

Turning to FIG. 4, an embodiment of a collimator is shown schematically. It includes a single mode (SM) fiber 402 and a graded index (GI) fiber 404, which has a length, L. Both the SM fiber 402 and the GI fiber 404 have an optical axis. The optical axis for the SM fiber 402 and the GI fiber 404 are their respective geometric centers. As shown in FIG. 4, the SM fiber 402 and the GI fiber 404 are positioned along a common optical axis 406. The length of the GI fiber 404, L, is measured along the optical axis 406. Input light beam 408 passes through the SM fiber 402, through GI fiber 404 and emerges as an output beam 410 substantially along a forward direction of the optical axis 406.

Both the rear face 403 and the front face 405 of the GI fiber are cut and polished at an angle. The angle of the rear face 403 with respect to a plane normal to the optical axis is six to eight degrees, though it could be greater or lesser depending upon the particular application. This angle is made to maximize return loss along the backward direction. The angle of the front face 405 with respect to a plane normal to the optical axis is less than four degrees, though it could be greater depending upon the particular application. Typically, the angle of the front face 405 will be between one and three degrees.

The SM fiber 402 is cut at an angle complementary to the rear face 403 of the GI fiber 404 so that these surfaces are exactly matched. Specifically, the SM fiber has been cut at 6 to 8 degrees, exactly the same as that of the rear facet of the GI fiber 404. The GI fiber section and single mode fiber can be attached in a number of ways. They can be glued or fused together to achieve index matching and reduce or eliminate reflections at their interface. In the case of fusing them together, the SM fiber 402 and the rear face of the GI fiber 404 can also be cut at right angle. In this case the fusion technique is applied to eliminate reflections at their interface and ensure the beam quality. To maximize the return loss, an anti-reflection (AR) coating is applied onto the front face 405 of the GI fiber 404.

As shown in FIG. 4, a light beam 408 input along the optical axis of the system will emerge from the GI fiber 404 at an angle, θ, in a vertically upward direction with respect to the optical axis 406, when the SM fiber 402 and the GI fiber 404 are both aligned on a common optical axis 406. This angle results from refraction at the front face 405 of the GI fiber 404, which is itself at a small angle. Typically, θ can range from less than one degree to a few degrees. In order to select a desired angle, the SM fiber 402 is adjusted by shifting the SM fiber 402 upward or downward with respect to the optical axis.

The above-described configuration can be further applied to form a mini isolator pair and array. The optical beam propagation through the mini isolator shown in FIG. 1 is made in the same plane as mentioned above. This feature can also be seen in FIG. 2, where the optical elements are divided into three zones and the optical beams propagation happens in the central zone, as the mini collimators are located right at the optical axis. With the mini collimator pair or array replacing the single mini collimators used in the mini isolator shown FIG. 1, a mini isolator pair or mini isolator array is constructed based upon the same optical layout, if the aperture of all optical elements is large enough to allow the optical propagation for each individual isolator unit. There will be no interference among different isolator units in the same assembly, as firstly the optical quality and uniformity of all optical elements are good enough and so the scattering is not an issue, and secondly the optical aperture of all optical elements is large enough and will not cause scattering at the boundaries. In the described configuration, a mini isolator pair can still be packaged within 2.5 mm in diameter and 15 mm in length.

Although the invention has been described with reference to specific embodiments, those skilled in the art will appreciate that many modifications and variations can be made without departing from the spirit and scope of the invention. All such modifications and variations are intended to be encompassed within the scope of the following claims.

We claim:

1. A fiber optic isolator comprising:
   an input collimator positioned along an optical axis and configured to receive a beam of light through an optical fiber along the optical axis and to emit the beam of light at an angle with respect to the optical axis;
   a first birefringence crystal having an input face and an output face, wherein the first birefringence crystal is positioned along the optical axis and configured to receive the beam of light from the input collimator, wherein the input face is positioned at an angle with respect to the optical axis, and wherein the first birefringence crystal separates the beam of light into an e-beam and an o-beam;
   a waveplate positioned along the optical axis and configured to receive the e-beam and the o-beam from the first birefringence crystal, wherein the e-beam and the o-beam have a polarization and wherein the waveplate is configured to rotate the polarization by 45 degrees in a first direction;
   a Faraday rotator perpendicularly positioned along the optical axis and configured to receive the e-beam and the o-beam from the waveplate and to rotate the polarization by a further 45 degrees in the first direction; a second birefringence crystal having an input face and an output face, wherein the second birefringence crystal is positioned along the optical axis and configured to receive the e-beam and the o-beam from the Faraday rotator, wherein the output face of the second birefringence crystal is positioned at an angle with respect to the optical axis and wherein the faces of said first and second birefringence crystals are selectively positioned in parallel so that the angle of the output face of the second birefringence crystal matches the angle of the input face of the first birefringence crystal and wherein the second birefringence crystal combines the e-beam and the o-beam and emits the combined beam at an angle off of the optical axis; and an output collimator positioned along the optical axis and configured to receive the combined beam from the second birefringence crystal and to reorient the combined beam along the optical axis and at an angle with respect to the optical axis.

2. The fiber optic isolator of claim 1, wherein the input collimator and the output collimator comprise a graded index fiber.

3. The fiber optic isolator of claim 1, wherein a distance between the input collimator and the first birefringence crystal is equal to a distance between the second birefringence crystal and the output collimator.

4. The fiber optic isolator of claim 3, wherein the first and the second birefringence crystal have an equal length.

5. The fiber optic isolator of claim 4, wherein the angle of the input face of the first birefringence crystal and the output face of the second birefringence crystal are selected so that a path length of the e-beam and the o-beam from the front face of the first birefringence crystal to the output face of the second birefringence crystal are equal.

6. The fiber optic isolator of claim 4, wherein the angle of the input face of the first birefringence crystal and the output face of the second birefringence crystal are selected so that a path length of the e-beam and the o-beam from the front face of the first birefringence crystal to the output face of the second birefringence crystal are equal to minimize polarization mode dispersion, and whereby the polarization mode dispersion is less than or approximately equal to 0.01 ps.

7. The fiber optic isolator of claim 1, wherein the waveplate and the Faraday rotator each rotate the polarization counterclockwise along a forward direction of the optical axis.

8. A fiber optic isolator comprising: a first and a second birefringence crystals each having an input face and an output face, wherein the first and second birefringence crystals are positioned along an optical axis so that the faces of said first and second birefringence crystals are selectively positioned in parallel and at an angle with respect to the optical axis; and wherein the first birefringence crystal is configured to receive a beam of light from a fiber optic system wherein the beam of light enters the first birefringence crystal at an angle with respect to the optical axis and wherein the second birefringence crystal is configured to emit the beam of light into a fiber optic system at an angle with respect to the optical axis; and a means for rotating polarization of the beam of light, along a forward direction wherein the means is perpendicularly positioned along the optical axis between the first and the second birefringence crystals.

9. The fiber optic isolator of claim 8, wherein the first birefringence crystal is configured to divide the beam into an e-beam and an o-beam and the second birefringence crystal is configured to combine the e-beam and the o-beam.

10. The fiber optic isolator of claim 9, wherein when said e-beam and said o-beam are transmitted along a backward direction the first birefringence crystal does not combine the e-beam and the o-beam.

11. The fiber optic isolator of claim 9, wherein the input face of the first birefringence crystal and the output face of the second birefringence crystal are at an equal angle with respect to the optical axis.

12. The fiber optic isolator of claim 11, wherein the output face of the first birefringence crystal and the input face of the second birefringence crystal are at an equal angle with respect to the optical axis.

13. The fiber optic isolator of claim 12, wherein the first and second birefringence crystals have an equal length and wherein a path length of the e-beam and a path length of the o-beam are equal from the input face of the first birefringence crystal to the output face of the second birefringence crystal.

14. The fiber optic isolator of claim 8, wherein the means for rotating polarization of the beam of light rotates the e-beam and the o-beam by ninety degrees in a forward direction along the optical axis and by zero degrees in a backward direction along the optical axis.

15. The fiber optic isolator of claim 14, wherein the means for rotating polarization of the beam of light comprises a waveplate and a Faraday rotator positioned along the optical axis.

16. The fiber optic isolator of claim 8 further comprising an input collimator positioned along the optical axis before the first birefringence crystal and an output collimator positioned along the optical axis after the second birefringence crystal.

17. The fiber optic isolator of claim 16, wherein the fiber optic isolator has a diameter of approximately 2.5 mm or less and a length of approximately 15 mm or less.

18. A method of isolating a beam of light in a fiber optic system comprising the steps of: passing the beam of light through a first collimator wherein the first collimator is positioned along an optical axis and wherein the beam of light emerges from the first collimator at angle with respect to the optical axis; passing the beam of light that emerges from the first collimator into a first birefringence crystal having and input face and an output face, wherein the first birefringence crystal separates the beam of light into an e-beam and an o-beam and wherein the e-beam emerges from birefringence crystal at an angle with respect to the o-beam; passing the e-beam and the o-beam that emerge from the first birefringence crystal into a waveplate and a Faraday rotator perpendicularly positioned along the optical axis, wherein the e-beam and the o-beam are each rotated by ninety degrees; passing the e-beam and the o-beam that emerge from the waveplate and the Faraday rotator through a second birefringence crystal having and input face and an output face, wherein the faces of said first and second birefringence crystals are selectively positioned in parallel and at an angle with respect to the optical axis; and wherein the second birefringence crystal combines the e-beam and the o-beam and wherein the combined beam emerges from the birefringence crystal at an angle with respect to the optical axis; and passing the combined beam that emerges from the second birefringence crystal into a second collimator wherein the second collimator is positioned along the optical axis and wherein the beam of light that emerges from the second collimator is aligned along the optical axis.

19. The method of claim 18, wherein the step of passing the beam of light that emerges from the first collimator into the first birefringence crystal comprises refracting the e-beam at a first angle and refracting the o-beam at second angle different than the first angle.

20. The method of claim 18, further comprising the step of passing a reflected beam of light through the waveplate and the Faraday rotator in a backward direction without changing the polarization of the reflected beam of light.

* * * * *